(12) United States Patent
Mabote

(10) Patent No.: US 12,046,069 B2
(45) Date of Patent: Jul. 23, 2024

(54) SYSTEMS AND METHODS FOR PROVIDING EXTRACTION ON INDUSTRIAL DIAGRAMS AND GRAPHICS

(71) Applicant: Rockwell Automation Technologies, Inc., Mayfield Heights, OH (US)

(72) Inventor: Itumeleng Mabote, Randburg (ZA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 359 days.

(21) Appl. No.: 17/653,984

(22) Filed: Mar. 8, 2022

(65) Prior Publication Data

US 2023/0290170 A1 Sep. 14, 2023

(51) Int. Cl.
| | |
|---|---|
| *G06V 30/422* | (2022.01) |
| *G06F 3/04842* | (2022.01) |
| *G06F 40/134* | (2020.01) |
| *G06V 10/22* | (2022.01) |
| *G06V 30/19* | (2022.01) |
| *G06V 30/41* | (2022.01) |

(52) U.S. Cl.
CPC .......... *G06V 30/422* (2022.01); *G06F 40/134* (2020.01); *G06V 10/23* (2022.01); *G06V 30/19007* (2022.01); *G06V 30/41* (2022.01); *G06F 3/04842* (2013.01)

(58) Field of Classification Search
CPC ......... G06F 2203/04806; G06F 3/0482; G06F 3/04842; G06F 3/04845; G06F 40/134; G06V 10/23; G06V 30/19007; G06V 30/41; G06V 30/422
See application file for complete search history.

(56) References Cited

U.S. PATENT DOCUMENTS

| | | | |
|---|---|---|---|
| 2002/0026385 A1* | 2/2002 | McCloskey | G06Q 30/0641 705/26.8 |
| 2013/0031508 A1* | 1/2013 | Kodosky | G06F 3/04817 715/800 |

(Continued)

OTHER PUBLICATIONS

Esteban Arroyo et al.,(NPL DOC: "Automatic derivation of qualitative plant simulation models from legacy piping and instrumentation diagrams," May 12, 2016, Computers and Chemical Engineering 92 (2016),pp. 112-125.).*

(Continued)

*Primary Examiner* — Omar S Ismail

(57) ABSTRACT

A method to facilitate extraction of display objects for industrial diagrams are disclosed herein. The method comprises: receiving user input indicating a first display object within an industrial diagram; extracting the first display object to generate a first graphic extraction template; identifying one or more regions within the first graphic extraction template; masking the text information; linking each of the one or more regions with at least a portion of an object name of the first display object; extracting all the display objects, from the industrial diagram, that are of the type of the first display object using the first graphic extraction template to generate a first set of extracted graphic objects; and for each of the first set of extracted graphic objects, matching text information within each of the one or more regions with at least a portion of an object name.

20 Claims, 16 Drawing Sheets

(56) References Cited

U.S. PATENT DOCUMENTS

| | | | |
|---|---|---|---|
| 2014/0179274 A1* | 6/2014 | O'Meara | H04L 63/0281 |
| | | | 455/411 |
| 2014/0229426 A1* | 8/2014 | Gootee, III | G06F 30/13 |
| | | | 707/608 |
| 2015/0161193 A1* | 6/2015 | Damodar | G06F 16/2365 |
| | | | 707/694 |
| 2016/0085418 A1* | 3/2016 | Kling | G06F 3/04842 |
| | | | 715/771 |
| 2019/0041842 A1* | 2/2019 | Cella | G05B 23/0264 |
| 2019/0222596 A1* | 7/2019 | Abbaszadeh | G06F 21/554 |
| 2019/0388787 A1* | 12/2019 | Padmanabhan | A63F 13/47 |

OTHER PUBLICATIONS

Paulo Ivson et al.,(NPL DOC: "CasCADe: A Novel 4D Visualization System for Virtual Construction Planning," Oct. 1, 2017, IEEE Transactions on Visualization and Computer Graphics, vol. 24, No. 1, Jan. 2018,pp. 687-694.).*

Bernard Kamsu-Foguem et al.,(NPL DOC: "Graph-based reasoning in collaborative knowledge management for industrial maintenance," Jul. 17, 2013, Computers in Industry 64 (2013),pp. 998-1010.).*

* cited by examiner

| Tagname | Description | Type | Document | Page | Display Name | Rel X Position | Rel Y Position | Secondary Linked Graphic Found | Secondary Rotation |
|---|---|---|---|---|---|---|---|---|---|
| AA01_TK001_H03_HS | Lime Milk Distribution Pump 1 Suction Shut-Off | MsVlv2sS | 20200706-All.pdf | 1 | AA01_70005 | 34.40% | 44.30% | True | 0 |
| AA01_TK001_H01_HS | Lime Milk Distribution Pump 1 Pressure Shut-Off | MsVlv2sS | 20200706-All.pdf | 1 | AA01_70005 | 34.40% | 63.66% | True | 0 |
| AA01_TK001_H02_HS | Lime Milk Distribution Pump 2 Suction Shut-Off | MsVlv2sS | 20200706-All.pdf | 1 | AA01_70005 | 59.95% | 63.66% | True | 0 |
| AA01_TK001_H04_HS | Lime Milk Distribution Pump 2 Pressure Shut-Off | MsVlv2sS | 20200706-All.pdf | 1 | AA01_70005 | 59.95% | 44.30% | True | 0 |

SYSTEMS AND METHODS FOR PROVIDING EXTRACTION ON INDUSTRIAL DIAGRAMS AND GRAPHICS

TECHNICAL FIELD

Aspects of the disclosure are related to computing hardware and software technology for providing extraction on industrial diagrams and graphics, and more specifically related to computing hardware and software technology for providing extraction on piping and instrumentation diagrams (P&IDs) and human-machine interface (HMI) static graphics.

TECHNICAL BACKGROUND

Various manufacturing processes and other industrial operations occur in industrial automation environments. Some examples of industrial automation environments include industrial mining operations, automobile manufacturing factories, food processing plants, oil drilling operations, microprocessor fabrication facilities, and other types of industrial enterprises. Industrial automation environments typically involve many complex systems and processes which are often spread out over various disparate locations.

Industrial automation environments utilize various machines during the industrial manufacturing process, such as drives, pumps, motors, compressors, valves, robots, and other mechanical devices. These devices have various moving parts and other components that are driven by instructions received from industrial controller systems. Machine builders, solution providers, and other content creators typically produce the control logic needed to run on these industrial controller systems in order to control the mechanical functions of the devices and carry out their intended functions.

Industrial environments also commonly include a human-machine interface (HMI). An HMI typically receives and processes the status data from the machines to generate various graphical displays, which may indicate the current and historical performance of the machines. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

Overview

Engineers usually have to manually extract information based on the graphical representation of equipment or instruments found on a P&ID or an HMI display. This manual extraction is time consuming and tedious, and requires manually updating the extracted data whenever there is a change in the P&ID or the HMI display. Systems and methods for providing extraction of display objects within P&ID or HMI are disclosed herein.

One embodiment relates to a method to facilitate extraction of display objects for industrial diagrams. The method includes: receiving an industrial diagram comprising a plurality of display objects; receiving user input indicating a user selected display object; extracting the user selected display object to generate a graphic extraction template, wherein the graphic extraction template has the same visual appearance of the user selected display object; applying mask on one or more regions within the graphic extraction template containing text information specific to the user selected display object; generating a link between each of the one or more regions and at least a portion of an object name of the user selected display object; extracting all the display objects that have the same type as the user selected display object using the graphic extraction template to generate a set of extracted graphic objects; and identifying an object name for each of the set of extracted graphic objects using the one or more links associated with the graphic extraction template.

Another embodiment relates to a non-transitory computer-readable medium comprising computer-executable instructions that, when executed, are configured to cause a processor to perform operations comprising: receiving an industrial diagram comprising a plurality of display objects; receiving user input indicating a user selected display object; extracting the user selected display object to generate a graphic extraction template, wherein the graphic extraction template has the same visual appearance of the user selected display object; applying mask on one or more regions within the graphic extraction template containing text information specific to the user selected display object; generating a link between each of the one or more regions and at least a portion of an object name of the user selected display object; extracting all the display objects that have the same type as the user selected display object using the graphic extraction template to generate a set of extracted graphic objects; and identifying an object name for each of the set of extracted graphic objects using the one or more links associated with the graphic extraction template.

Another embodiment relates to an apparatus to facilitate extraction of display objects for industrial diagram, the apparatus comprising: one or more computer-readable storage media; a processing system operatively coupled with the one or more computer-readable storage media; and program instructions stored on the one or more computer-readable storage media that, when executed, are configured to cause the processing system to perform operations comprising: receiving an industrial diagram comprising a plurality of display objects; receiving user input indicating a user selected display object; extracting the user selected display object to generate a graphic extraction template, wherein the graphic extraction template has the same visual appearance of the user selected display object; applying mask on one or more regions within the graphic extraction template containing text information specific to the user selected display object; generating a link between each of the one or more regions and at least a portion of an object name of the user selected display object; extracting all the display objects that have the same type as the user selected display object using the graphic extraction template to generate a set of extracted graphic objects; and identifying an object name for each of the set of extracted graphic objects using the one or more links associated with the graphic extraction template.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 9 is a table that illustrates an output file of the extracted valve objects according to some embodiments;

FIG. 10 is a block diagram that illustrates an exemplary extractor tool executing on a computing system according to some embodiments;

DETAILED DESCRIPTION

Figure 1:
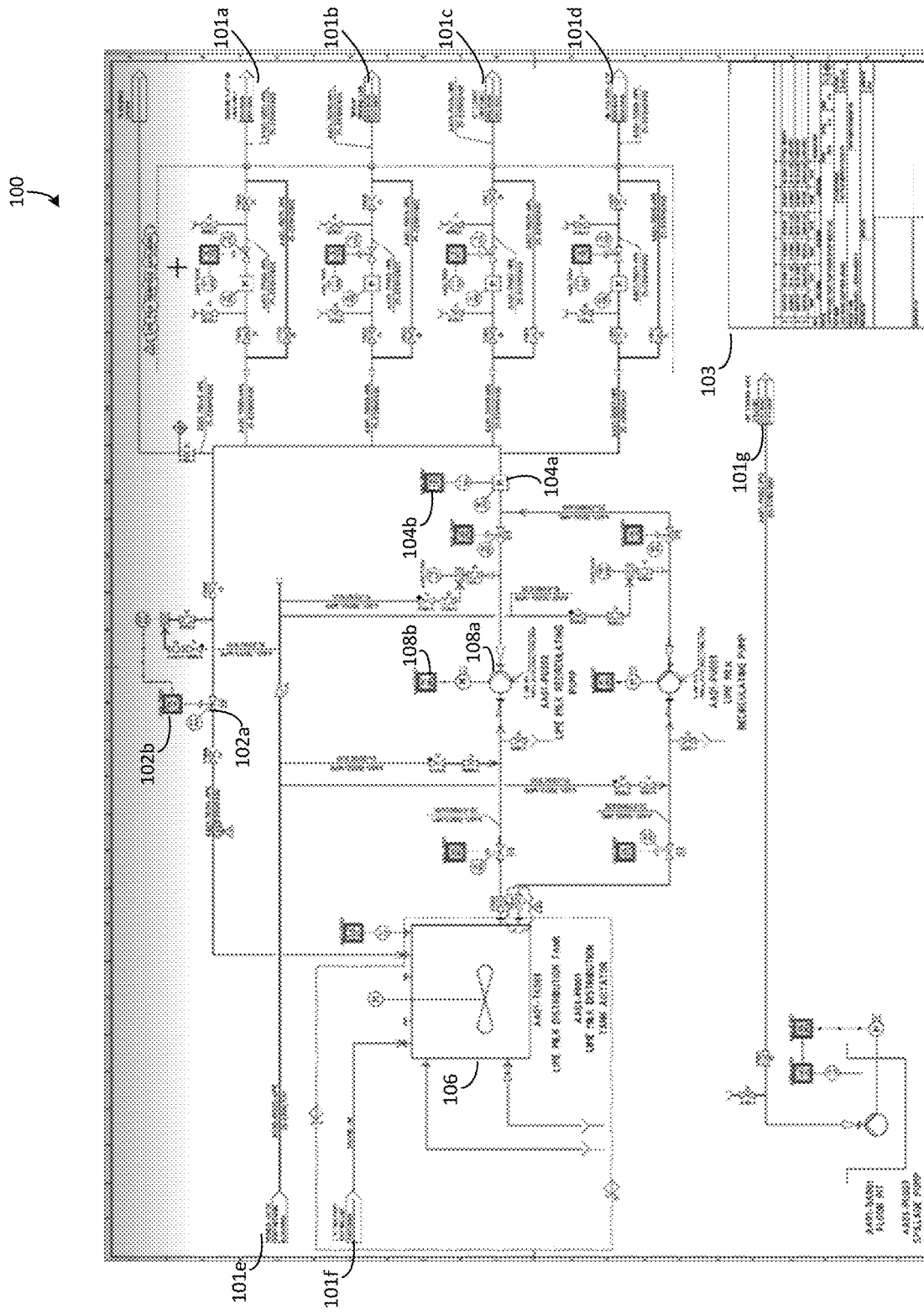
FIG. 1 is a block diagram that illustrates a piping and instrumentation diagram (P&ID) associated with an industrial automation environment in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A piping and instrumentation diagram (P&ID) provides a detailed graphical overview of an industrial automation environment, such as a manufacturing factory, processing plant, fabrication facility, and other types of industrial enterprises. Generally, a P&ID comprises a schematic drawing that illustrates the process flow and industrial equipment along with the instrumentation and control devices. A P&ID typically includes mechanical equipment such as pressure vessels, tanks, pumps, motors, compressors, drives, valves and other industrial assets, process pipelines and flow directions, process control and status monitoring instrumentation, and other objects employed in an industrial automation process.

Engineers often work to develop customized HMI displays to monitor and control specific industrial operations. Generally, when creating customized HMI displays, an engineer may refer to the P&ID to get an overview of the plant and see how the various industrial equipment and other objects are laid out and interconnected to one another. The engineer would then typically create the HMI displays according to the P&ID by manually placing and arranging objects linked to various devices and instruments within the HMI displays. Customized HMI displays can also be generated based on existing HMI displays with different format that is not compatible with the customized HMI displays. In this case, engineers have to refer to the existing HMI displays and manually place and arrange objects within the customized HMI displays. In some cases, the P&ID or existing HMI may include a large number of pages to display the whole diagram. It can take months or years of manual labor to create a customized HMI display. These manual process of creating customized HMI displays can be very time consuming and tedious.

The techniques described herein facilitate the creation of customized HMI displays by automatically extracting graphical objects from a P&ID or an existing HMI file that may be imported into an HMI application for inclusion on an HMI display. In at least one implementation, a software tool is provided for extracting static graphical objects from a P&ID or an HMI. The tool allows an engineer to define each type of object and then creates an extraction template for the defined type of object, extracts all the objects that match the extraction template and save the extracted objects in an HMI-compatible file format. Once the HMI graphic objects are generated, an engineer can import the HMI graphics into an HMI application for inclusion on an HMI display, thereby avoiding having to manually draw the object in the HMI application.

Referring now to FIG. 1, an industrial diagram of industrial automation environment 100 is illustrated in an exemplary embodiment. The industrial diagram 100 may include any suitable industrial diagrams such as P&ID, HMI diagrams, etc. The industrial automation environment is provided as an example environment that may utilize any of the techniques disclosed herein, but note that the present disclosure could equally apply to any other industrial applications. In this example, industrial automation environment comprises a mineral processing facility. The industrial diagram 100 may include one or more pages according to some embodiments. Each page displays at least a portion of the industrial diagram 100. For example, the industrial diagram 100 may include sixty pages to display the whole diagram. The industrial diagram 100 includes various components used in the mineral processing facility, such as valves 102a, flow sensors 104a, tanks 106, pumps 108a, etc. The industrial diagram 100 may also include diagram information section 103 indicating various information related to the industrial automation environment, such as industrial device operating parameters, project name, process name, date, project manager names, etc. In some embodiments, when the industrial diagram 100 includes more than one page, the industrial diagram 100 may include page link objects 101 (such as page link objects 101a-101g). Each page link object indicates where the connected object is linked to in another page. In other words, the page link objects 101 show the connections in the whole diagram that are cut by pages.

The techniques described below with respect to FIGS. 1-13 could be executed by a computing system, such as computing system 810, and could be combined with operation 1400 of FIG. 14 in some implementations. In this example, some of the industrial objects appearing in the industrial diagram of industrial automation environment 100 is labeled with a tag component. These tag components provide a reference to help uniquely identify each of the objects. In this example, the valves 102a are shown as having tag components 102b, the flow sensor 104a has tag components 104b, mixing tank 106, and the pumps 108a has tag components 108b.

In some implementations, the industrial diagram file could comprise an image file, a portable document format (PDF) file, or any other type of graphical file format. By loading the industrial diagram into a graphic extractor tool described herein, a user can select a type of graphical display objects and its corresponding tag components within the extractor tool, which may then be created as an extraction template. The extractor tool uses the extraction template to automatically identify and extract the selected type of graphical objects into an HMI-compatible file format which can then be imported into an HMI application for use in creating an HMI display.

With respect to FIGS. 2-13, a graphic extractor tool 200 for extracting one or more types of objects from the industrial diagram 100 is shown according to an illustrative embodiment. The graphic extractor tool 200 is configured to extract any objects within an industrial diagram, such as various symbols representing industrial components, texts displaying on the industrial diagram, page link objects, etc. The extraction is provided by creating an extraction template for each type of objects according to user inputs. Each extraction template identifies the shape of a corresponding type of objects, the texts and/or labels associated with the corresponding type of objects, the orientation of the corresponding type of objects, the name structures of the corresponding type of objects, etc. The graphic extractor tool 200 may use the extraction template to search through the whole industrial diagram 100 to identify and extract all the objects that has the corresponding type according to some embodiments. The graphic extractor tool 200 may use the extraction templates to search through one or more user selected pages within the industrial diagram 100 to identify and extract all the objects, within the selected pages, that has the corresponding type according to some embodiments.

Figure 2:
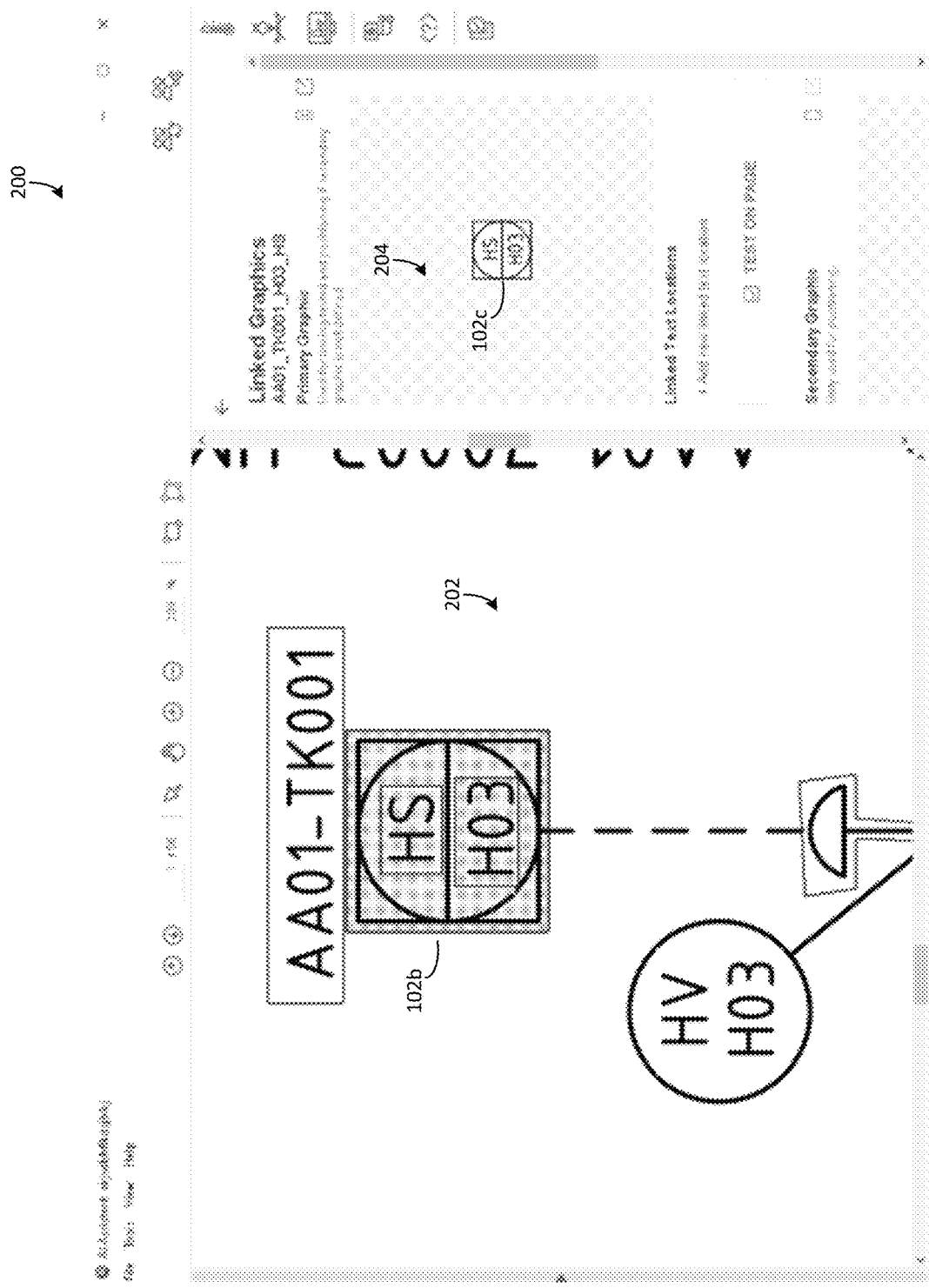
FIG. 2 is a block diagram that illustrates an exemplary extractor tool executing on a computing system according to some embodiments.

As shown in FIG. 2, after a user opens an industrial diagram file within the extractor tool 200, the industrial diagram is displayed in a diagram display window 202. The diagram display window allows user to zoom in/out of a displayed diagram. In some embodiments, if the industrial diagram has multiple pages, the user can select a page for display. For example, FIG. 2 illustrates that the industrial diagram includes fifty-six pages, and the user selects the first page for display. In some example embodiments, FIGS. 2-9 show how the extractor tool 200 extracts all the valves that has the same type as the valve 102a. The extractor tool 200 is configured to create an extraction template using the valve 102a according to user inputs. The type of valves such as the valve 102a is associated with tag components labeling each valve and indicating a name and/or other information of the valve (e.g., the tag component 102b.) The extractor tool 200 allows the user to draw an outline surrounding the tag component 102b and reproduce the tag component 102b as a primary graphic. The extractor tool 200 displays the reproduced tag component 102c within a primary graphic window 204. The extractor tool 200 may reproduce the tag component 102b using any suitable image processing algorithms.

Figure 3:
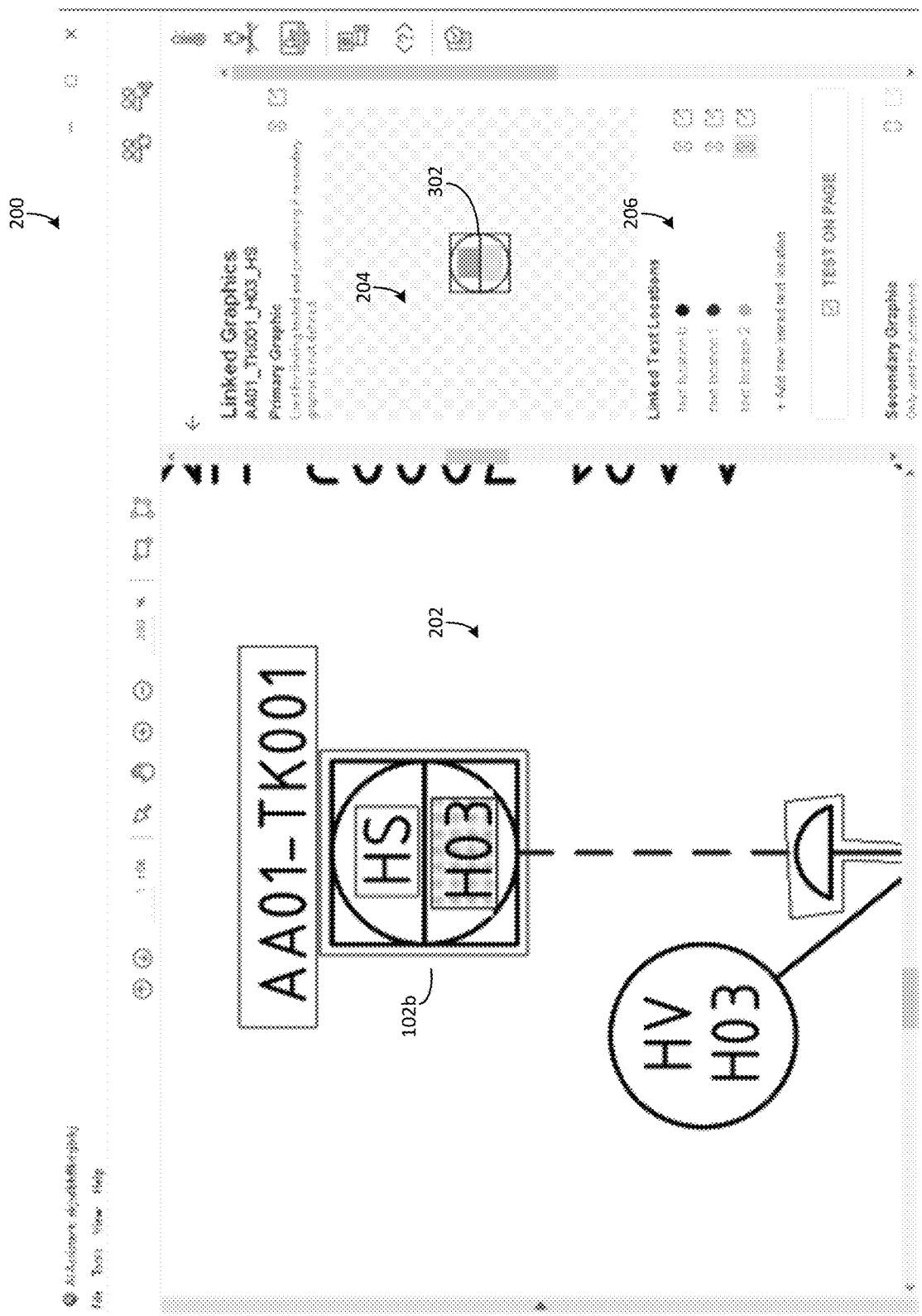
FIG. 3 is a block diagram that illustrates the exemplary extractor tool of FIG. 2 executing on a computing system according to some embodiments.

As shown in FIG. 3, the graphic extractor tool 200 further allows the user to select one or more regions containing text information that is located around or within the tag component 102b. For example, the text information HS and H03 within the tag component 102b, and the text information AA01-TK001 around the tag component 102b. The extractor tool 200 determines the location for each user selected text region and link it to the reproduced tag component 102c. In some embodiments, the location for each user selected text region may be locations relative to the reproduced tag component 102c. Each selected text region is saved and displayed as a text location in a linked text locations window 206. For example, within linked text locations window 206, a first text location (text location 0) is created and corresponds to the text information AA01-TK001, a second text location (text location 1) is created and corresponds to the text information H03, and a third text location (text location 2) is created and corresponds to the text information HS.

In addition, the extractor tool 200 applies a mask on each of the text location so that the reproduced tag component 102c does not include the text information. After applying the mask on each text location, the reproduced tag component 102c remains the outlines of the component alone and all the text information is removed from the reproduced tag component 102c. For example, as displayed in the primary graphic window 204, the text information HS, H03, and AA01-TK001 are removed (e.g., masked out) from the primary graphic. In this way, when the extractor tool 200 searches through the industrial diagram, the extractor tool 200 can find and extract all the valve tag components that have the same graphical structure as the primary extraction component 102c regardless of what text information is associated with the tag component (e.g., different names). The outline of the reproduced tag component 102c is saved as a primary graphic extraction template 302. The primary graphic extraction template 302, the text locations, and the masks are saved as part of the extraction template.

Figure 4:
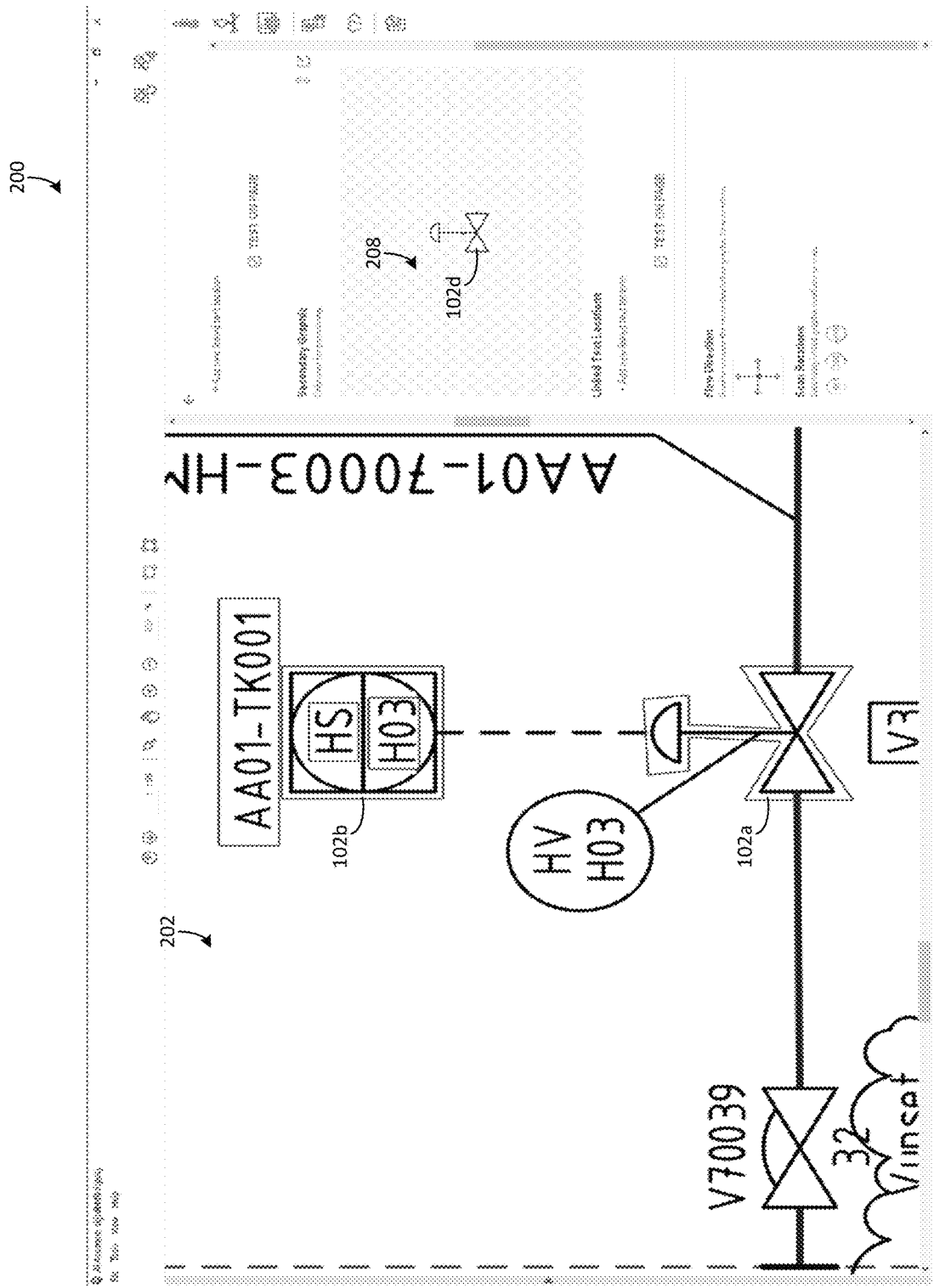
FIG. 4 is a block diagram that illustrates the exemplary extractor tool of FIG. 2 executing on a computing system according to some embodiments.

As shown in FIG. 4, the extractor tool 200 allows the user to draw an outline surrounding the valve 102a and reproduce the valve 102a as a secondary graphic. The extractor tool 200 displays the reproduced valve 102d within a secondary graphic window 208. The extractor tool 200 may reproduce the valve 102a using any suitable image processing algorithms. The reproduced valve 102d is saved a s secondary graphic extraction template. If there are one or more regions that contain text information associated with the secondary graphic extraction template, similarly as the primary graphic extraction template 302, the graphic extractor tool 200 applies masks to the text information so that the secondary graphic extraction template contains only outlines of the object and does not contain any specific text information. The extractor tool 200 creates the extraction template to include the primary graphic extraction template and the secondary extraction template. In some embodiments, if an object is only associated with one graphical component, the extractor tool 200 creates the extraction template using only the primary graphic extraction template. For example, if there is a valve that does not have a tag component associated with, the valve will be reproduced as a primary graphic extraction template.

Figure 5:
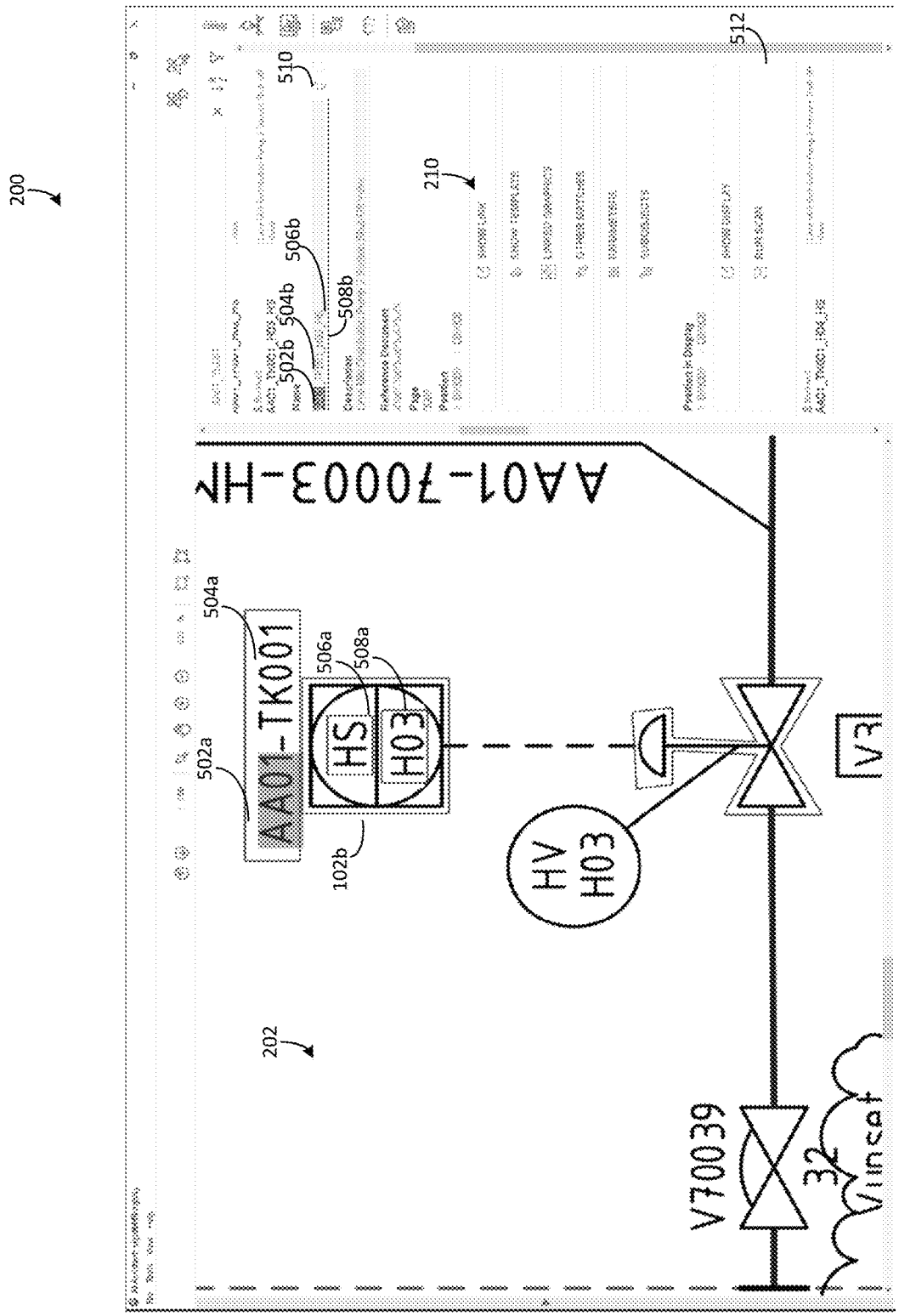
FIG. 5 is a block diagram that illustrates the exemplary extractor tool of FIG. 2 executing on a computing system according to some embodiments.

As shown in FIG. 5, the extractor tool 200 further allows the user to link an object name of the extraction template (e.g., the valve 102a) to the text information associated with the extraction template. The extractor tool 200 may receive a list of objects names indicating what objects are and their names within the industrial diagram 100. The extractor tool 200 allows the user to select the object name that matches the text information through a dropdown list or through a search box. For example, the user selects the object name AA01_TK001_H03_HS that matches the text information around and within the tag component 102b. The extractor tool 200 further allows the user to select each element of the object name and a corresponding matching element within the text information. For example, the user can select AA01 502b within the object name and the AA01 502a within the text information of the tag component 102b. The user can further use the link button 510 to link the two elements. Once the two elements 502a and 502b are linked, the extractor tool 200 identifies which text region associated with the object is according to which element of an object name. Similarly, the extractor tool 200 can link the elements 504a and 504b, elements 506a and 506b, elements 508a and 508b, respectively.

When the extractor tool 200 extracts an object using the extraction template, the extractor tool 200 can identify which object name corresponds to the extracted object automatically. In some embodiments, if the text information associated with the extraction template does not match any object name within the list, the user can create a name for the specific extraction template in a similar way as other available names. For example, in some embodiments, if the list of object name does not include the name AA01_TK001_H03_HS, the user may use the format of the available name AA01_TK001_H02_HS and the text information associated with the selected object to create a name for the selected object. In these embodiments, when the extractor tool 200 extracts another object that is not associated with an available name, the extractor tool 200 can create a name for the object in a way similarly as the user defined the name for the extraction template automatically.

Figure 6:
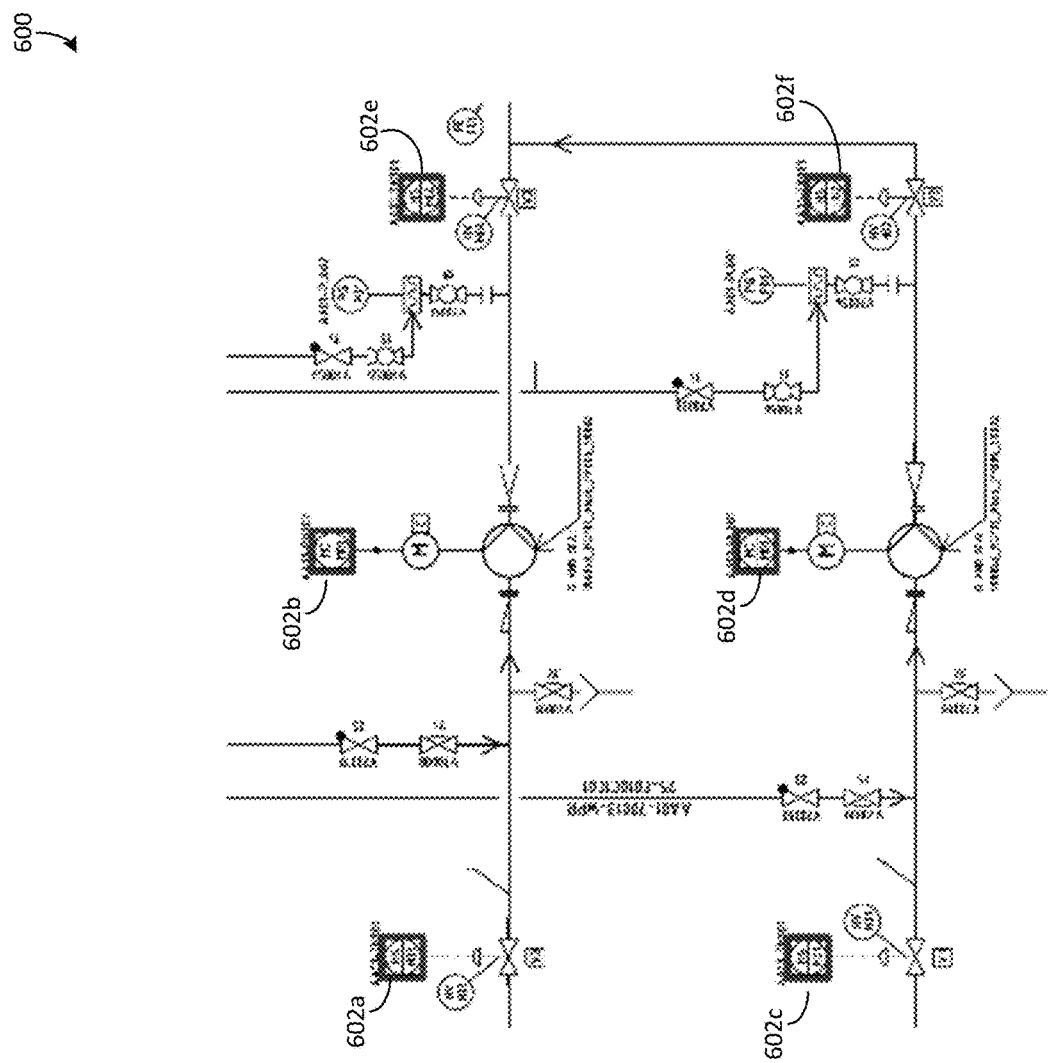
FIG. 6 is a block diagram that illustrates an exemplary portion of an industrial diagram with identified tag objects according to some embodiments.

Once the extraction template is created and linked with an object name, the extractor tool 200 uses the extraction template to search through one or more user defined pages within the industrial diagram automatically. In some embodiments, the extractor tool 200 receives user input through the RUN SCAN button 512 to start scan or search through the one or more user defined pages within the industrial diagram. As shown in FIG. 6, the extractor tool 200 can identify all the objects 602a-602f that matches the primary graphic extraction template 302. All the identified objects 602a-602f are tag components. However, these tag components are not all for the specific type of valve as the valve 102a which is shown in the secondary extraction graphic template 102d. For example, the identified tag component 602b and 602d are associated with pumps 108 instead of valve 102a.

Figure 7:
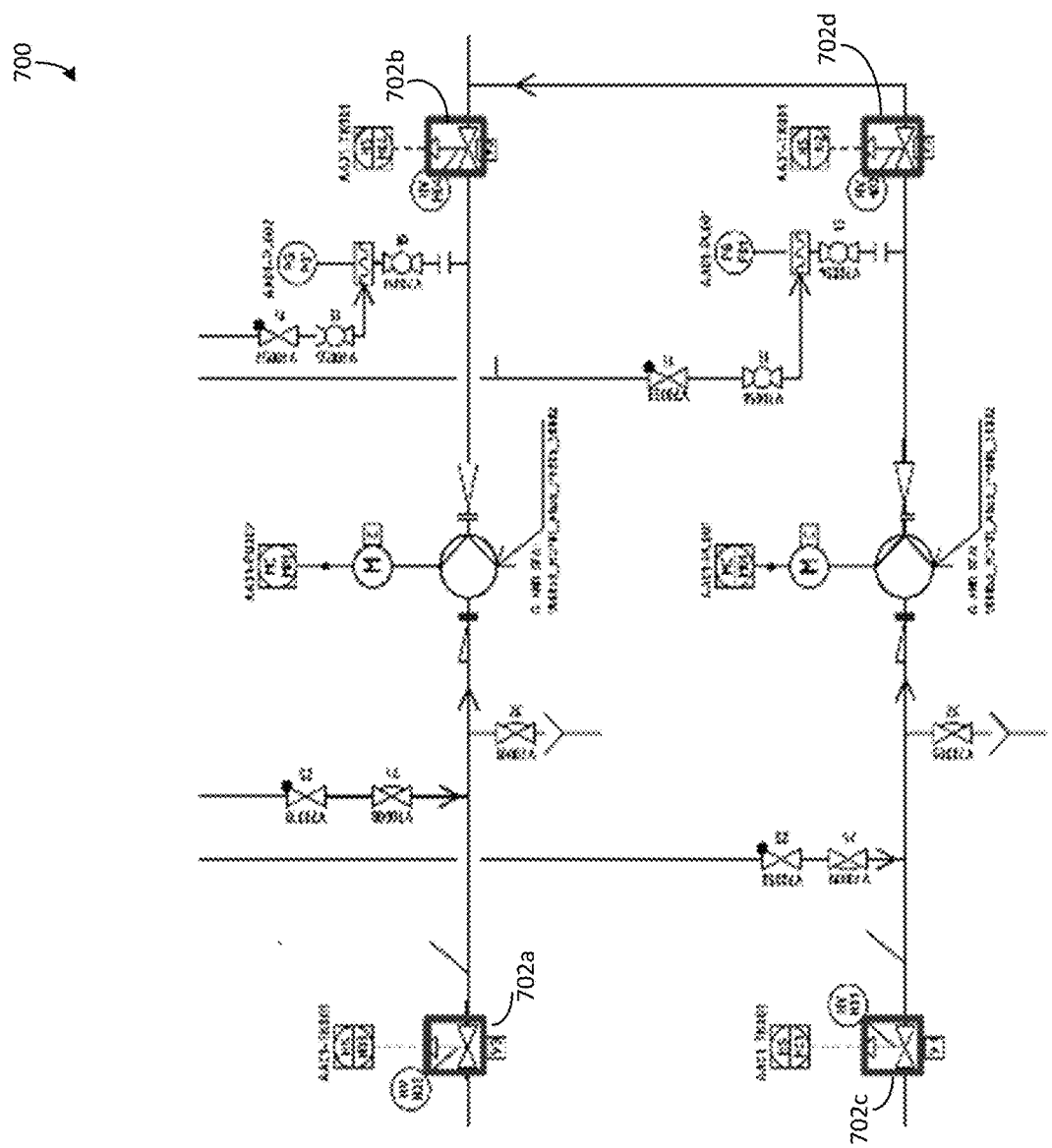
FIG. 7 is a block diagram that illustrates an exemplary portion of an industrial diagram with identified valve objects according to some embodiments.
Figure 8:
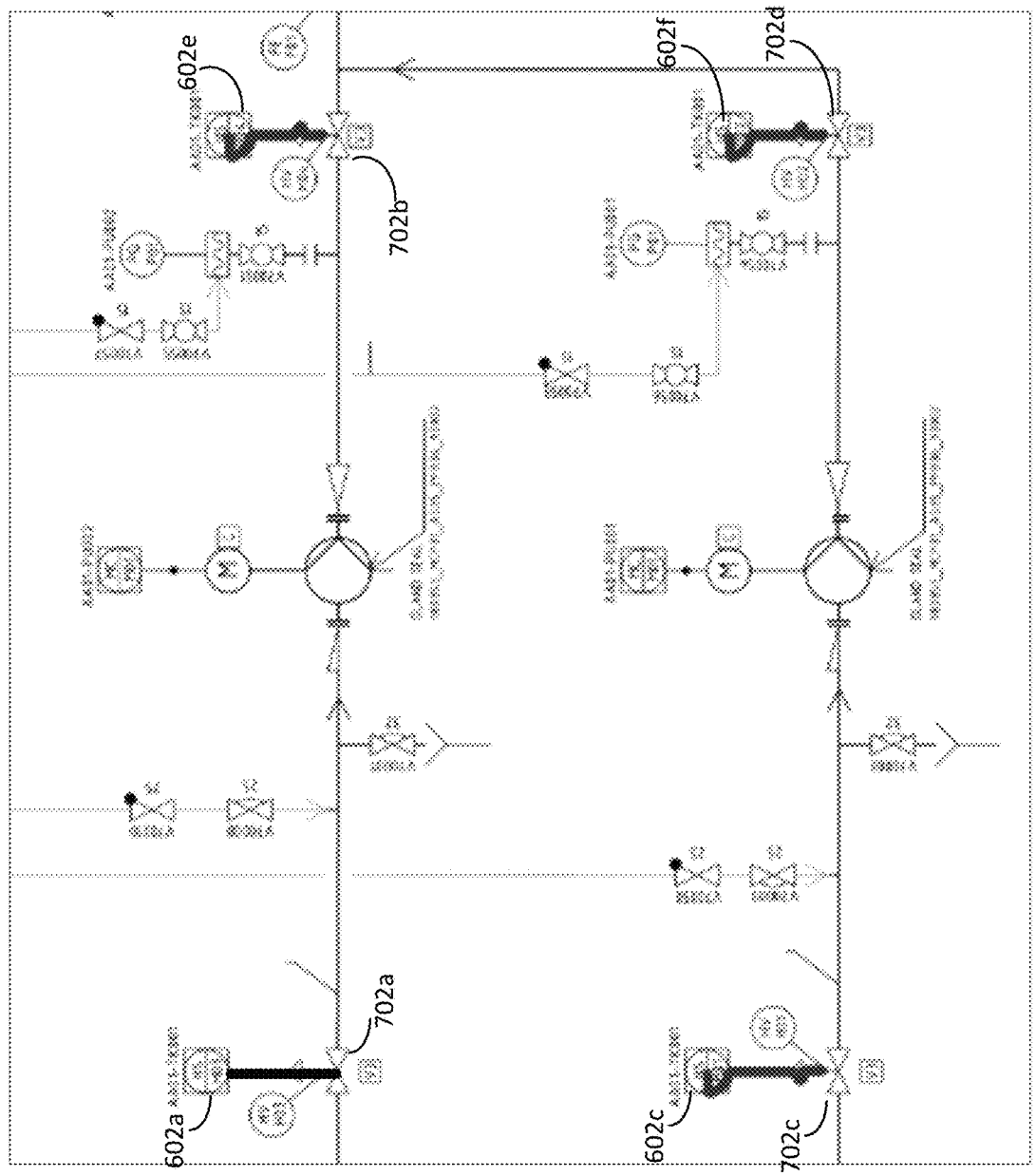
FIG. 8 is a block diagram that illustrates an exemplary portion of an industrial diagram with identified valve objects and their corresponding tag objects according to some embodiments.

As shown in FIG. 7, the extractor tool 200 can also identify all the objects 702a-702d that matches the secondary extraction graphic template 102d. All the identified objects 702a-702d are valves that has the same type as the valve 102a. In order to match each identified tag component with a corresponding identified valve component, the extractor tool 200, for each identified valve component, determines a shortest path between the valve component and all the identified tag components. In this way, the extractor tool 200 can find each pair of matching tag component and valve component. For example, as shown in FIG. 8, in order to find the corresponding tag component 602a for the valve 702a, the extractor tool 200 calculates a path between the valve 702a and each of the identified tag components 602a-602f. The extractor tool 200 further compares all the calculated paths and determines the shortest path. Once the shortest path between the valve component 702a and the tag component 602a is determined, the extractor tool 200 determines the valve 702a is associated with the tag component 602a. Similarly, for each identified valve, the extractor can determine the corresponding through the shortest path method. In this way, the tag components 602b and 602d that are not associated with any valve can be filtered out automatically. In some embodiments, the extractor tool 200 can use any suitable shortest path finding algorithms, such as Dijkstra's algorithm.

When the extractor tool 200 identified all the pairs of valves and corresponding tag components using the extraction template the extractor tool 200 can generate an extraction output file to include the extracted objects and all the relevant information associated with the extracted objects. As shown in FIG. 9, the extraction output file may include, for each extracted valve, the tag name, description, object type, document name of the industrial diagram, the page on which the object is extracted, the HMI display page name, the relative positions of the extracted object within the page, whether the secondary linked graphic found, the secondary rotation, etc. In some embodiments, the extractor tool 200 may use this extraction output file to generate an HMI file for the extracted components.

Figure 10:
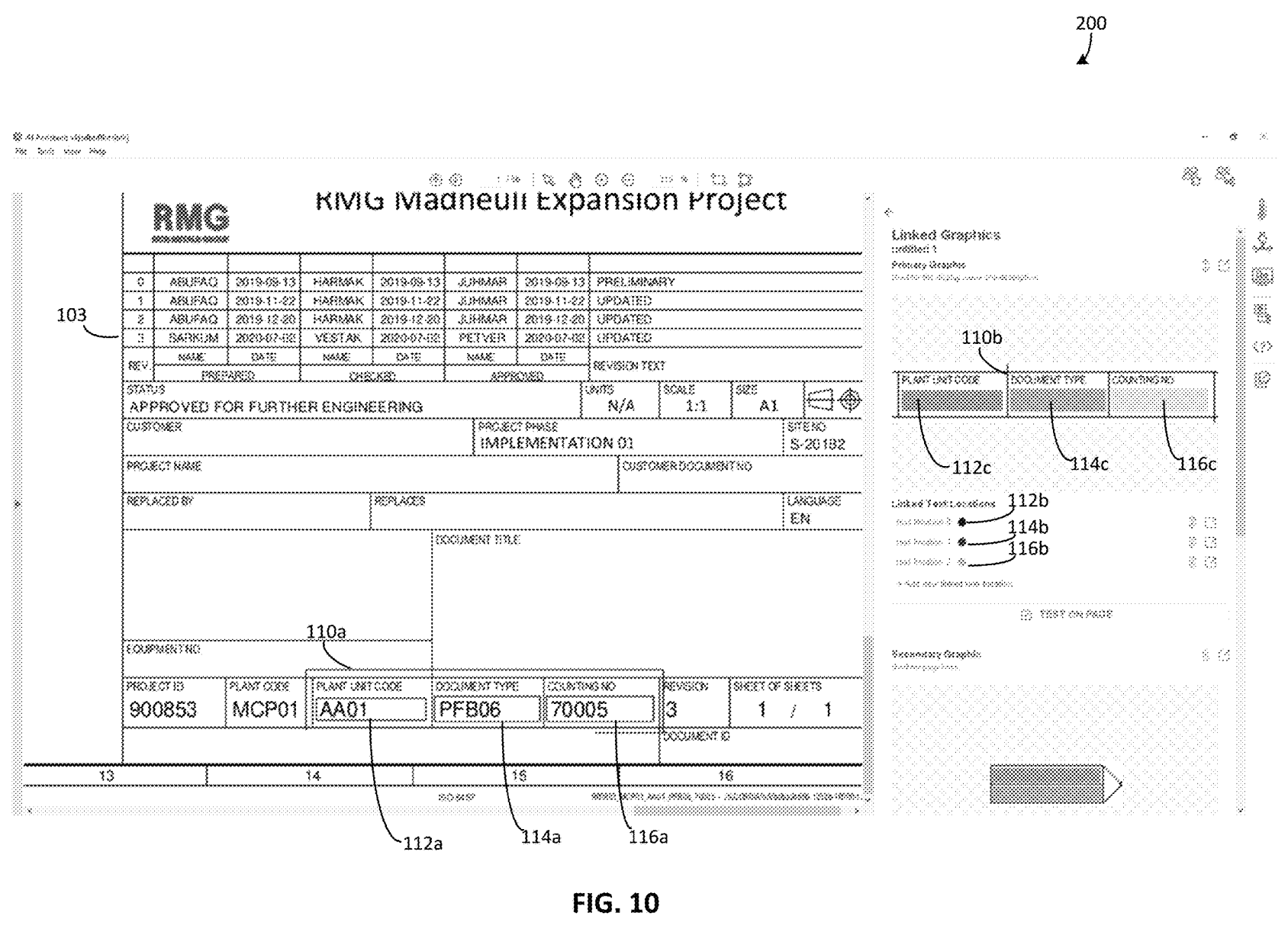

In some example embodiments, FIGS. 10-13 illustrate how the extractor tool 200 extracts page link objects. As shown in FIG. 10, the extractor tool 200 allows the user to select an object 110a in the diagram information section that is associated with page link objects. In some embodiments, the user can select the object 110a by drawing a box around the object 110a. The extractor tool 200 reproduces the selected object 110a in the primary graphic window and creates a primary page link extraction template 110b. The extractor tool 200 further requires the user to identify regions that contains text information specific to this select object 110a, such as the regions 112a, 114a, and 116a. The extractor then applies masks on the user identified regions 112c, 114c, and 116c. In this way, the extractor tool 200 can use the primary page link extraction template 110b to identify all the objects within the diagram that has the similar outlines and similar general text information, such as "PLANT UNIT CODE", "DOCUMENT TYPE", and "COUNTING NO" as the selected object 110a. The extractor tool 200 further allows the user to link a text location to each region 112a, 114a, and 116a. For example, the region 112a that displays the masked-out object AA01 is linked to the location 0 112b, the region 114a that displays the masked-out object PFB06 is linked to the location 1 114b, and the region 116a that displays the masked-out object 70005 is linked to the location 2 116b. In this way, the extractor tool 200 can use the linked location and region to identify where to extract the specific text information.

Figure 11:
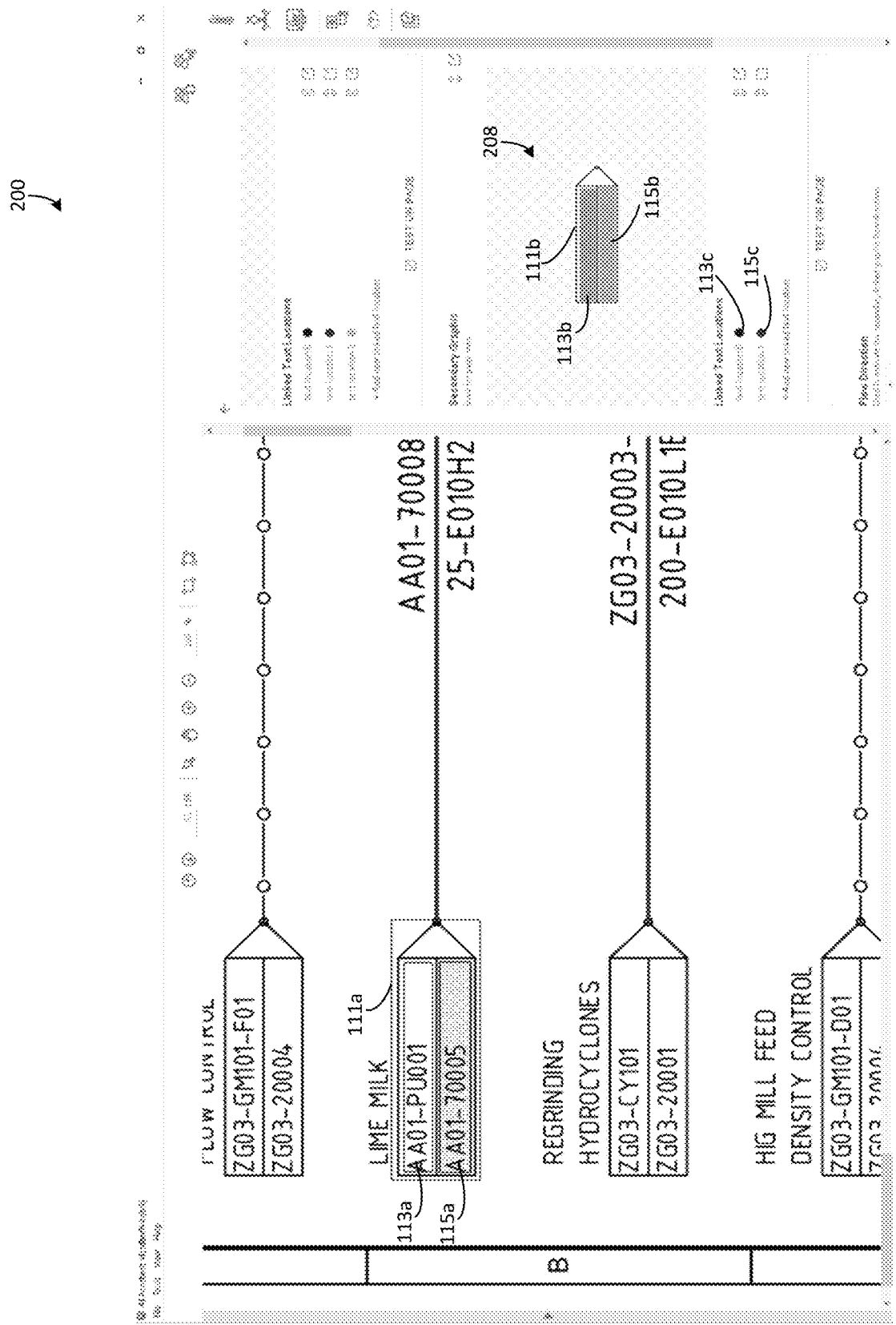
FIG. 11 is a block diagram that illustrates the exemplary extractor tool of FIG. 10 executing on a computing system according to some embodiments.

As shown in FIG. 11, the extractor tool 200 allows the user to select a page link object 111a. The extractor tool 200 reproduces the page link object and displays the reproduced page link object 111b in the secondary graphic window 208. The extractor tool 200 further requests the user to identify the text regions containing specific text information associated with the page link object 111a (e.g., the text regions 113a and 115a). The extractor tool 200 removes the text information from the text regions by applying masks on the text region. The extractor tool 200 then creates a secondary page link extraction template using the reproduces page link object 111b with masked-out text regions 113b and 115b. The extractor tool 200 also allows the user to link the text regions 113a and 115a to text locations 113c and 115c respectively. The extractor tool 200 can create a page link extraction template using the primary and secondary page link extraction templates.

Figure 12:
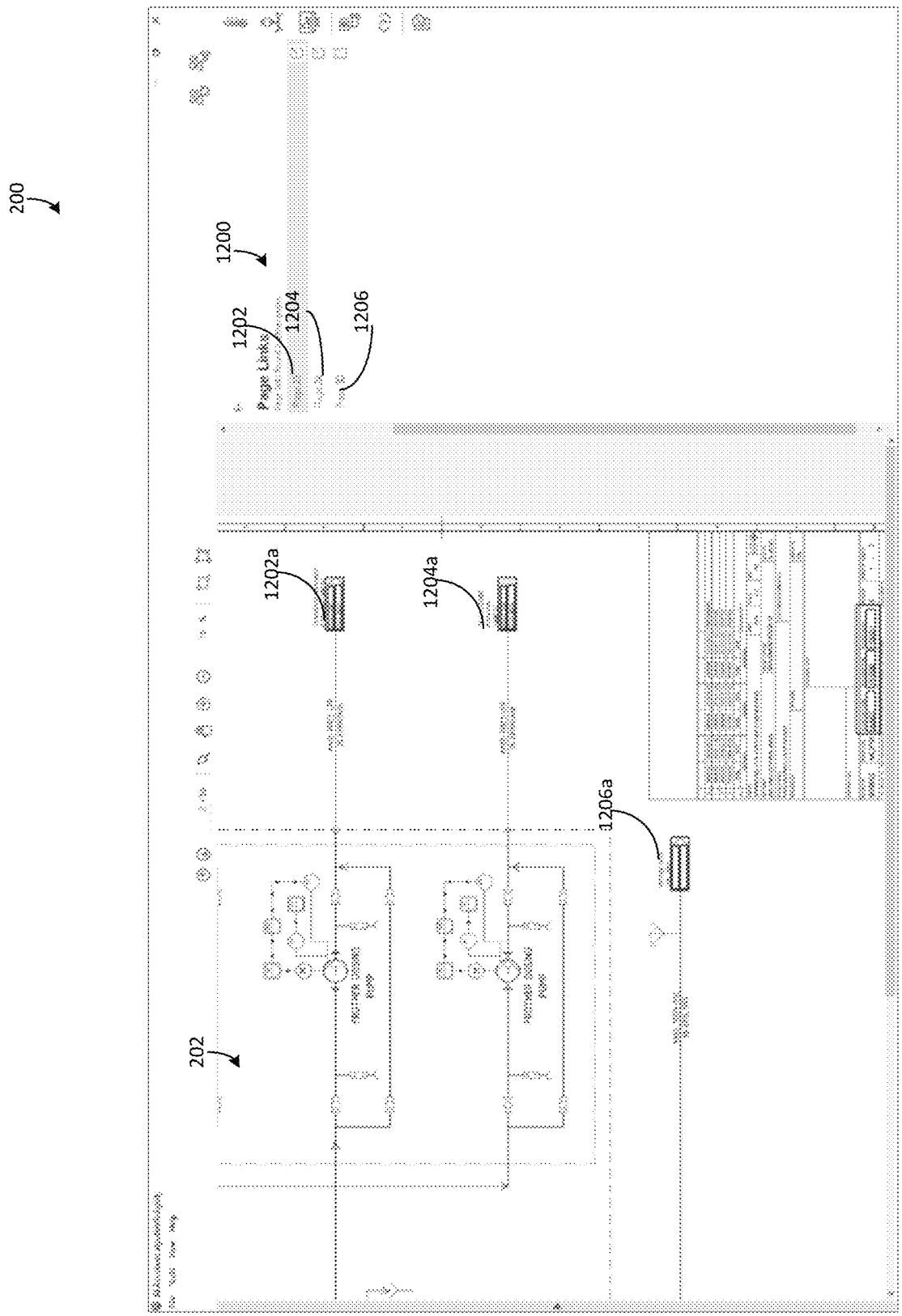
FIG. 12 is a block diagram that illustrates the exemplary extractor tool of FIG. 10 executing on a computing system according to some embodiments.
Figure 13:
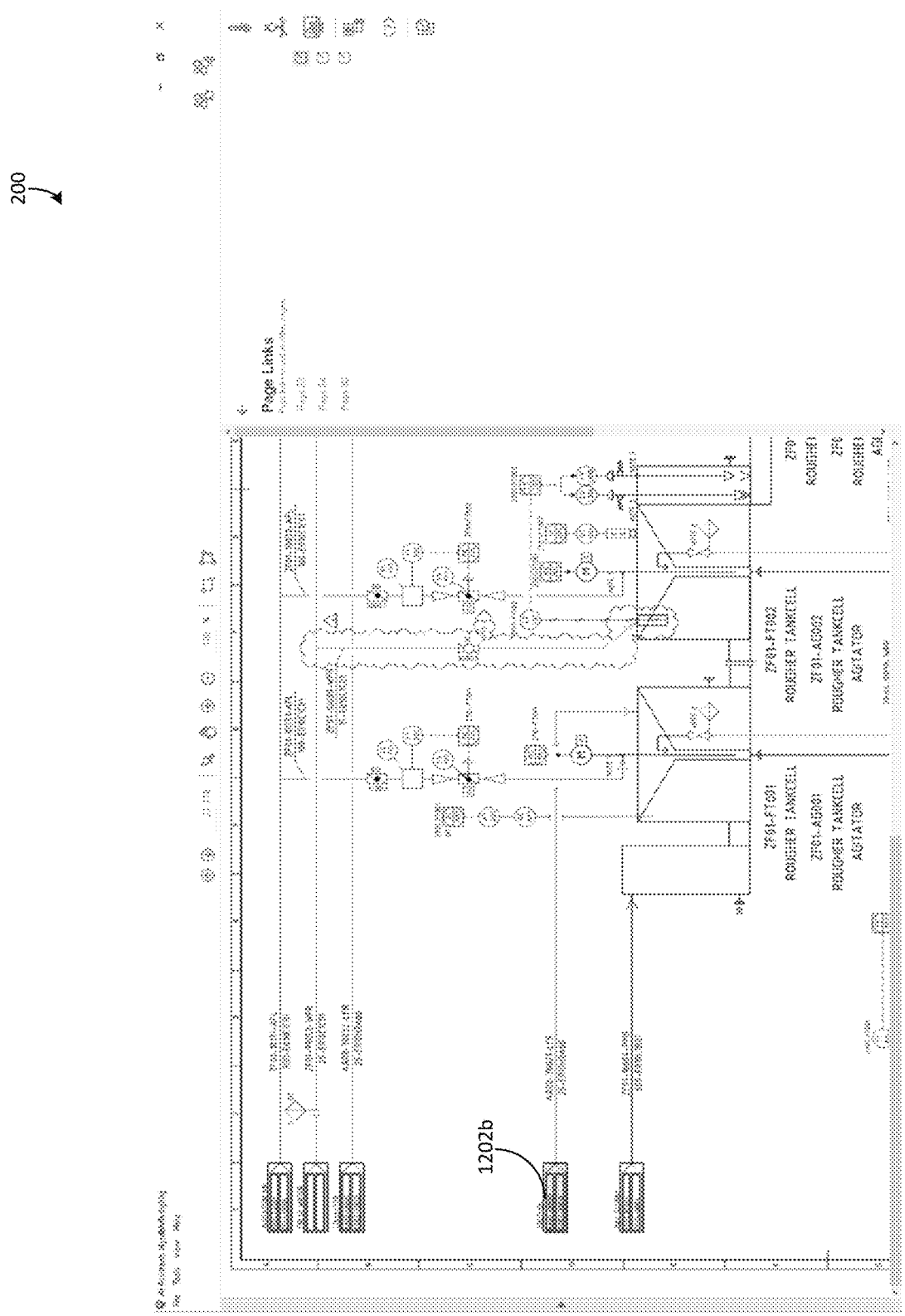
FIG. 13 is a block diagram that illustrates an exemplary extractor tool of FIG. 10 executing on a computing system according to some embodiments.

As shown in FIGS. 12 and 13, the extractor tool 200 can use the page link extraction template to find all the page link objects. The extractor tool 200 further identifies the specific text information associated with each extracted page link object and determine which two or more page link objects share the same text information. In this way, the extractor tool can find the related page link objects and create a hyperlink to link the relate page link objects. The extractor tool 200 can display the hyperlinks within a page links window 1200. For example, as shown in FIG. 12, the extractor tool 200 identifies the page link objects 1202a, 1204a, and 1206a in page 2 of the diagram and highlighted the identified objects 1202a, 1204a, and 1206a in the diagram display window 202. The extractor tool 200 also identifies one or more link objects that are related to each of the page link objects 1202a, 1204a, and 1206a. The extractor tool 200 creates a hyperlink 1202 to link the page link object 1202a with its related page link object 1202b as shown in FIG. 13. In some embodiments, the extractor tool 200 creates hyperlink icons within the page links window 1200. These hyperlink icons also indicate the page number where the related page link objects are located. When the user clicks the hyperlink icon, the extractor tool 200 switches from displaying the current page in the diagram display window 202 to displaying the linked page in the diagram display window 202. For example, as shown in FIG. 13, when the user clicks hyperlink icon page 23, the extractor tool 200 displays the page 13 of the diagram in the diagram display window 202 and highlighted the related page link object 1202b in the diagram display window 202. In this way, the user can easily navigate through linked pages within the diagram 100.

Figure 14:
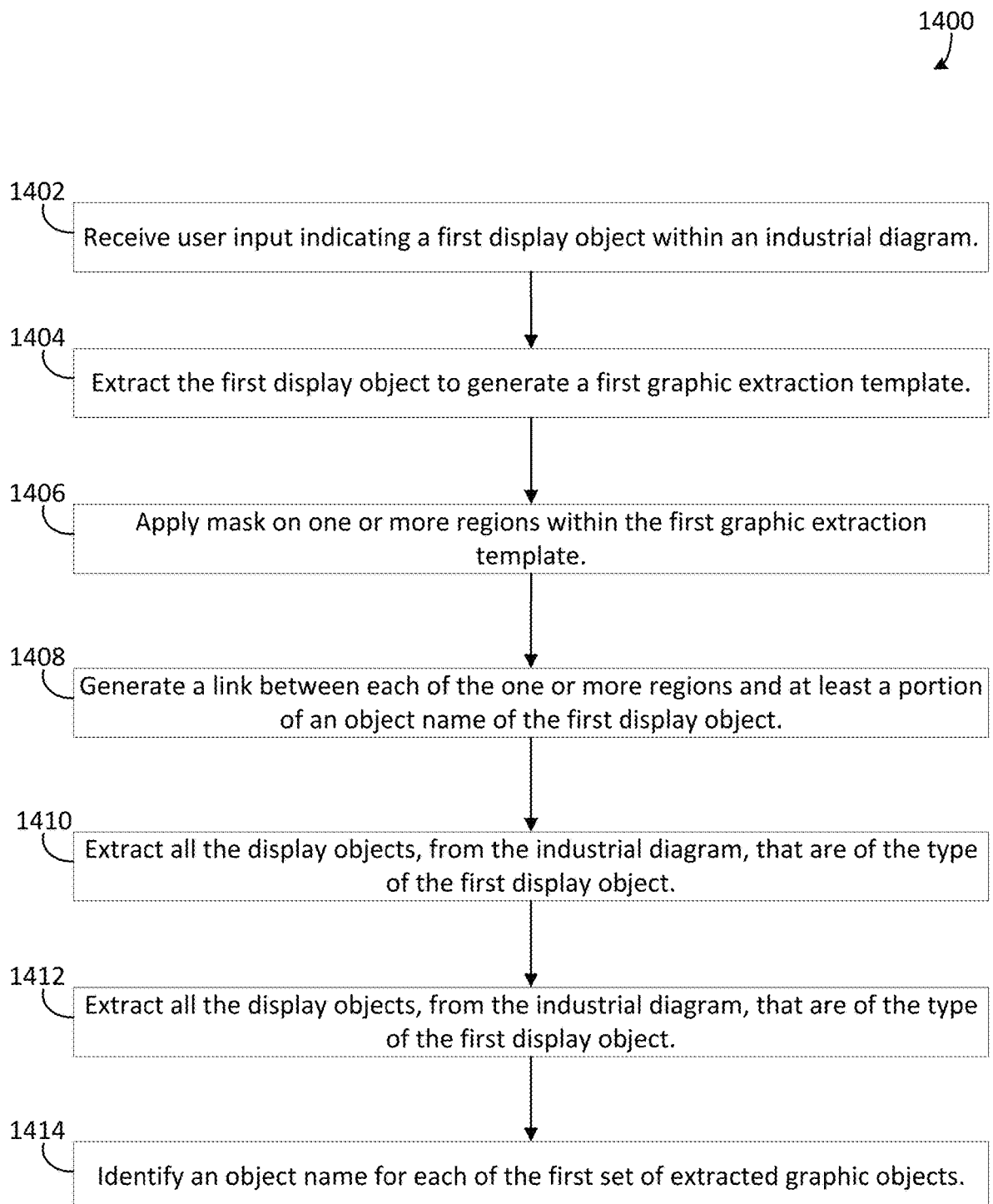
FIG. 14 is a flow diagram that illustrates an operation of a computing system in an exemplary implementation.

FIG. 14 is a flow diagram that illustrates an operation 1400 of a computing system to facilitate extraction of graphic objects for industrial diagrams in an exemplary embodiment. The operation 1400 shown in FIG. 14 may also be referred to as a graphic object extraction process 1400 herein. The steps of the operation are indicated below parenthetically.

At operation 1402, a user input indicating a user selected display object within an industrial diagram is received. The industrial diagram includes a plurality of display objects. In some embodiments, the industrial diagram may include one or more pages to display the whole diagram. Each page may display a portion of the diagram. When the industrial diagram includes multiple pages, these pages can be linked by one or more page link objects. In some embodiments, the user selected display object represents a type of objects that the user wants to extract from the industrial diagram. In some embodiments, the user selected display object is selected by the user drawing a box around the display object. an industrial diagram is received for processing extraction of one or more graphic objects.

At operation 1404, the user selected display object is extracted to generate a graphic extraction template. The graphic extraction template is generated by reproducing the user selected display object including the shape (e.g., outlines of the object) of the object, any text information associated with the object, the positions of the object within the industrial diagram, and an orientation of the object. In other words, the graphic extraction template has the same visual appearance as the user selected display object.

At operation 1406, mask is applied on one or more regions within the graphic extraction template containing text information specific to the user selected display object. In some embodiments, the one or more regions are selected by the user to apply the mask. When the user sees the text information is specific for the user selected display object instead of generic information for a type of display objects, the user can select the regions that contains this specific text information. These selected regions can be masked out (e.g., removed) from the graphic extraction template. In this way, the visual appearance of the masked-out graphic extraction template does not include any text information specific to the user selected object. The locations of the one or more regions that are applied mask are saved.

At operation 1408, a link between each of the one or more regions and at least a portion of an object name of the user selected display object is generated. Each region that is masked out with specific text information is linked to a portion of the file so that the graphic extraction template may include the location information of each masked out region and its corresponding portion within an object name.

At operation 1410, all the display objects that have the same type as the user selected display object are extracted using the graphic extraction template to generate a set of extracted graphic objects. The display objects that have the same type as the user selected display object when the display objects have the same visual appearance as the graphic extraction template. Since the graphic extraction template is already masked out of the specific text information, the graphic extraction template can be used to identify any display objects that have the same visual appearance as the template.

At operation 1412, an object name is identified for each of the set of graphic objects using the one or more links associated with the graphic extraction template. Each of the set of extracted graphic objects corresponds to an object name. The object name can be retrieved from a list of object names associated with the industrial diagram. The object name can be identified by identifying text information within one or more regions that has the same location as the masked out regions of the graphic extraction template. The text information identified within each region can be compared to its corresponding portion within each object name. If each text information of an extracted graphic object matches its corresponding portion of an object name, the object name is identified as associated with the extracted graphic object. In some embodiments, if the text information of an extracted graphic object does not match any object name, an object name is generated using the text information within each region as its corresponding portion within the object name.

Figure 15:
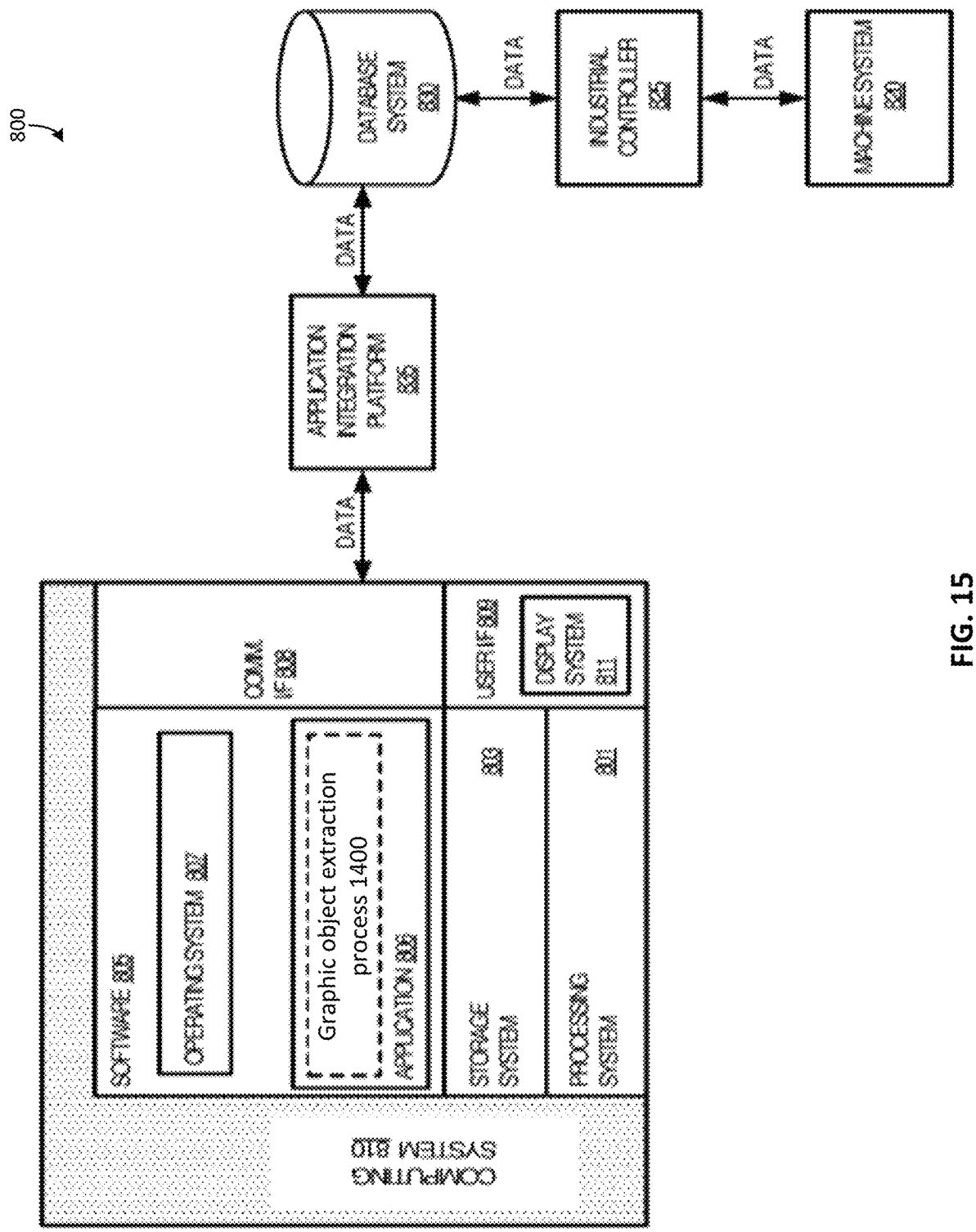
FIG. 15 is a block diagram that illustrates an operational scenario involving a computing system in an industrial automation environment in an exemplary implementation.

Turning now to FIG. 15, a block diagram that illustrates an industrial automation environment 800 in an exemplary implementation is shown. Industrial automation environment 800 provides an example of an industrial automation environment that may be utilized to implement the predictive maintenance processes disclosed herein, but other environments could also be used. Industrial automation environment 800 includes computing system 810, machine system 820, industrial controller 825, database system 830, and application integration platform 835. Computing system 810 provides an example of a computing system that may be used to execute the graphic object extraction process 1400 or variations thereof, although other possible computing systems could use alternative configurations. Machine system 820 and controller 825 are in communication over a communication link, controller 825 and database system 830 communicate over a communication link, database system 830 and application integration platform 835 communicate over a communication link, and application integration platform 835 and computing system 810 are in communication over a communication link. Note that there would typically be many more machine systems in most industrial automation environments, but the number of machine systems shown in FIG. 8 has been restricted for clarity.

Industrial automation environment 800 comprises an industrial mining operation, automobile manufacturing factory, food processing plant, oil drilling operation, microprocessor fabrication facility, or some other type of industrial enterprise. Machine system 820 could comprise a sensor, drive, pump, filter, drill, motor, robot, fabrication machinery, mill, printer, or any other industrial automation equipment, including their associated control systems. A control system comprises, for example, industrial controller 825, which could include automation controllers, programmable logic controllers (PLCs), programmable automation controllers (PACs), or any other controllers used in automation control. Additionally, machine system 820 could comprise other industrial equipment, such as a brew kettle in a brewery, a reserve of coal or other resources, or any other element that may reside in an industrial automation environment 800.

Machine system 820 continually produces operational data over time. The operational data indicates the current status of machine system 820, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 820 and/or controller 825 is capable of transferring the operational data over a communication link to database system 830, application integration platform 835, and computing system 810, typically via a communication network. Database system 830 could comprise a disk, tape, integrated circuit, server, or some other memory device. Database system 830 may reside in a single device or may be distributed among multiple memory devices.

Application integration platform 835 comprises a processing system and a communication transceiver. Application integration platform 835 may also include other components such as a router, server, data storage system, and power supply. Application integration platform 835 may reside in a single device or may be distributed across multiple devices. Application integration platform 835 may be a discrete system or may be integrated within other systems, including other systems within industrial automation environment 800. In some examples, application integration platform 835 could comprise a FactoryTalk® VantagePoint server system provided by Rockwell Automation, Inc.

The communication links over which data is exchanged between machine system 820, industrial controller 825, database system 830, application integration platform 835, and communication interface 808 of computing system 810 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, cellular networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 810 may be representative of any computing apparatus, system, or systems on which the graphic object extraction process 1400 disclosed herein or variations thereof may be suitably implemented. In some examples, computing system 810 could execute an HMI application for developing HMI displays, such as a FactoryTalk® View Studio application provided by Rockwell Automation, Inc. Computing system 810 provides an example of a computing system that could be used as a either a server or a client device in some implementations, although such devices could have alternative configurations. Examples of computing system 810 include mobile computing devices, such as cell phones, tablet computers, laptop computers, notebook computers, and gaming devices, as well as any other type of mobile computing devices and any combination or variation thereof. Examples of computing system 810 also include desktop computers, server computers, and virtual machines, as well as any other type of computing system, variation, or combination thereof. In some implementations, computing system 810 could comprise a mobile device capable of operating in a server-like fashion which, among other uses, could be utilized in a wireless mesh network.

Computing system 810 includes processing system 801, storage system 803, software 805, communication interface 808, and user interface 809. Processing system 801 is operatively coupled with storage system 803, communication interface 808, and user interface 809. Processing system 801 loads and executes software 805 from storage system 803. Software 805 includes application 806 and operating system 807. Application 806 may include the graphic object extraction process 1400 in some examples. When executed by computing system 810 in general, and processing system 801 in particular, software 805 directs computing system 810 to operate as described herein for the graphic object extraction process 1400 or variations thereof. In this example, user interface 809 includes display system 811, which itself may be part of a touch screen that also accepts user inputs via touches on its surface. Computing system 810 may optionally include additional devices, features, or functionality not discussed here for purposes of brevity.

Figure 16:
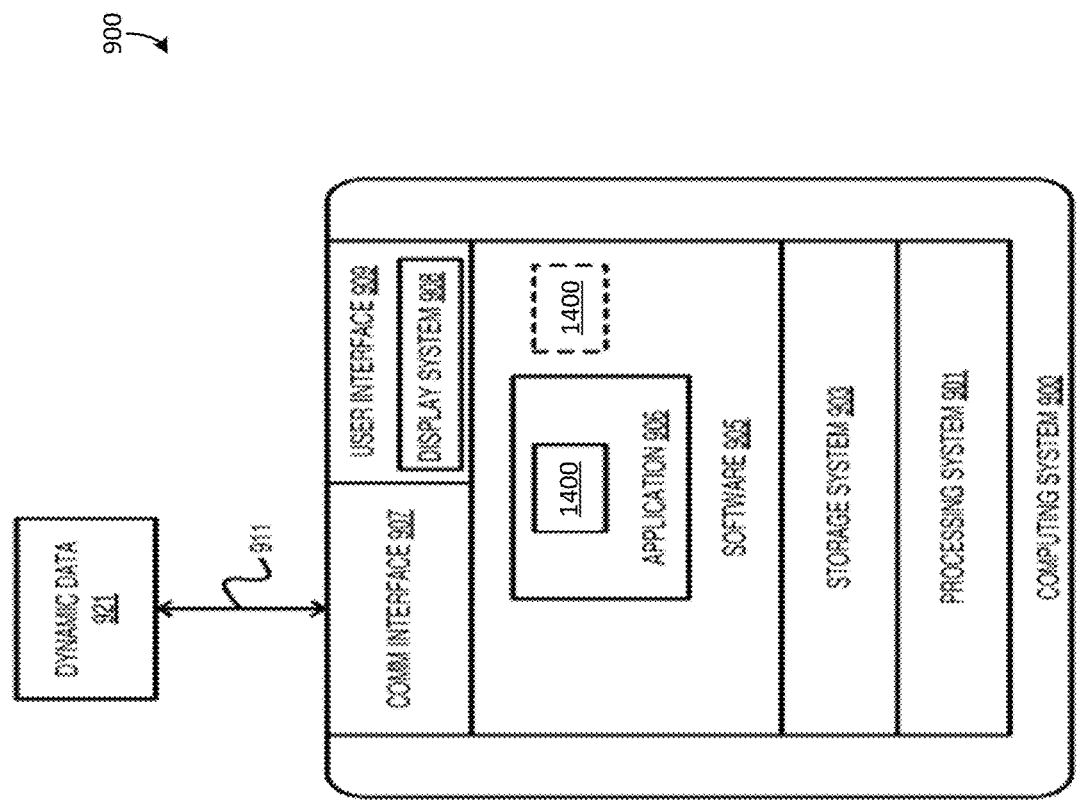
FIG. 16 is a block diagram that illustrates a computing system in an exemplary implementation.

Turning now to FIG. 16, a block diagram is shown that illustrates computing system 900 in an exemplary implementation. Computing system 900 provides an example of any computing system that may be used to execute the graphic object extraction process 1400 or variations thereof, although other possible computing systems could use alternative configurations. Computing system 900 includes processing system 901, storage system 903, software 905, communication interface 907, and user interface 909. User interface 909 comprises display system 908. Software 905 includes application 906 which itself includes the graphic object extraction process 1400. The graphic object extraction process 1400 may optionally be implemented separately from application 906, as indicated by the dashed line in FIG. 9.

Computing system 900 may be representative of any computing apparatus, system, or systems on which application 906 and the graphic object extraction process 1400 or variations thereof may be suitably implemented. Examples of computing system 900 include mobile computing devices, such as cell phones, tablet computers, laptop computers, notebook computers, and gaming devices, as well as any other type of mobile computing devices and any combination or variation thereof. Note that the features and functionality of computing system 900 may apply as well to desktop computers, server computers, and virtual machines, as well as any other type of computing system, variation, or combination thereof.

Computing system 900 includes processing system 901, storage system 903, software 905, communication interface 907, and user interface 909. Processing system 901 is operatively coupled with storage system 903, communication interface 907, and user interface 909. Processing system 901 loads and executes software 905 from storage system 903. When executed by computing system 900 in general, and processing system 901 in particular, software 905 directs computing system 900 to operate as described herein for the graphic object extraction process 1400 or variations thereof. Computing system 900 may optionally include additional devices, features, or functionality not discussed herein for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer-readable storage media capable of storing software 905 and readable by processing system 901. Storage system 903 may include volatile and nonvolatile, removable and non-removable media implemented in any method or technology for storage of information, such as computer readable instructions, data structures, program modules, or other data. Storage system 903 may be implemented as a single storage device but may also be implemented across multiple storage devices or sub-systems co-located or distributed relative to each other. Storage system 903 may comprise additional elements, such as a controller, capable of communicating with processing system 901. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 909, processing system 901 may load and execute portions of software 905, such as the graphic object extraction process 1400, to render a graphical user interface for application 906 for display by display system 908 of user interface 909. Software 905 may be implemented in program instructions and among other functions may, when executed by computing system 900 in general or processing system 901 in particular, direct computing system 900 or processing system 901 to receive a selection of a user-defined area that identifies at least a portion of a piping and instrumentation diagram (P&ID) associated with an industrial automation environment. Software 905 may further direct computing system 900 or processing system 901 to analyze the user-defined area of the P&ID to identify at least one object within the user-defined area of the P&ID. In addition, software 905 directs computing system 900 or processing system 901 to extract the at least one object identified within the user-defined area of the P&ID to generate a static graphic object. Software 905 may further direct computing system 900 or processing system 901 to receive edit instructions that describe at least one modification to a visual appearance of the static graphic object. Software 905 may direct computing system 900 or processing system 901 to apply the edit instructions to the static graphic object to generate an HMI graphic object comprising the at least one modification to the visual appearance of the static graphic object.

Software 905 may include additional processes, programs, or components, such as operating system software or other application software. Examples of operating systems include Windows®, iOS®, and Android®, as well as any other suitable operating system. Software 905 may also comprise firmware or some other form of machine-readable processing instructions executable by processing system 901.

In general, software 905 may, when loaded into processing system 901 and executed, transform computing system 900 overall from a general-purpose computing system into a special-purpose computing system customized to facilitate extraction of display objects for HMI displays as described herein for each implementation. For example, encoding software 905 on storage system 903 may transform the physical structure of storage system 903. The specific transformation of the physical structure may depend on various factors in different implementations of this description. Examples of such factors may include, but are not limited to the technology used to implement the storage media of storage system 903 and whether the computer-storage media are characterized as primary or secondary storage.

In some examples, if the computer-readable storage media are implemented as semiconductor-based memory, software 905 may transform the physical state of the semiconductor memory when the program is encoded therein. For example, software 905 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 900 is generally intended to represent a computing system with which software 905 is deployed and executed in order to implement application 906 and/or the graphic object extraction process 1400 (and variations thereof). However, computing system 900 may also represent any computing system on which software 905 may be staged and from where software 905 may be distributed, transported, downloaded, or otherwise provided to yet another computing system for deployment and execution, or yet additional distribution. For example, computing system 900 could be configured to deploy software 905 over the internet to one or more client computing systems for execution thereon, such as in a cloud-based deployment scenario.

Communication interface 907 may include communication connections and devices that allow for communication between computing system 900 and other computing systems (not shown) or services, over a communication network 911 or collection of networks. In some implementations, communication interface 907 receives dynamic data 921 over communication network 911. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 909 may include a voice input device, a touch input device for receiving a gesture from a user, a motion input device for detecting non-touch gestures and other motions by a user, and other comparable input devices and associated processing elements capable of receiving user input from a user. Output devices such as display system 908, speakers, haptic devices, and other types of output devices may also be included in user interface 909. The aforementioned user input devices are well known in the art and need not be discussed at length here. User interface 909 may also include associated user interface software executable by processing system 901 in support of the various user input and output devices discussed above. Separately or in conjunction with each other and other hardware and software elements, the user interface software and devices may provide a graphical user interface, a natural user interface, or any other kind of user interface. User interface 909 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate extraction of display objects for industrial diagrams, the method comprising:
   receiving user input indicating a first display object within an industrial diagram, wherein the industrial diagram comprises a plurality of display objects;
   extracting the first display object to generate a first graphic extraction template, wherein the first graphic extraction template has the same type of the first display object;
   identifying one or more regions within the first graphic extraction template that include text information specific to the first display object;
   masking the text information;
   linking each of the one or more regions with at least a portion of an object name of the first display object;
   extracting all the display objects, from the industrial diagram, that are of the type of the first display object using the first graphic extraction template to generate a first set of extracted graphic objects; and
   for each of the first set of extracted graphic objects, matching text information within each of the one or more regions with at least a portion of an object name.

2. The method of claim 1, wherein the industrial diagram is displayed on one or more pages.

3. The method of claim 2, further comprises: determining an object location within the industrial diagram for each extracted display object.

4. The method of claim 3, wherein the object location comprises a page number indicating a page at which the corresponding display object is extracted, and relative positions within the page.

5. The method of claim 4, further comprises: generating an extraction file to include the first set of graphic objects and corresponding object name, object location, and object type for each of the first set of graphic objects.

6. The method of claim 1, wherein each link is generated by relating a relative position of each of the one or more regions within the first graphic extraction template to a relative position of each portion of the object name of the user selected display object.

7. The method of claim 1, further comprising:
   receiving user input indicating a second display object which is associated with the first display object;
   extracting the second display object to generate a second graphic extraction template, wherein the second graphic extraction template has the same type of the second display object;
   applying mask on one or more regions within the second graphic extraction template containing text information specific to the second display object; and
   extracting all the display objects that are of the same type of the second display object using the second graphic extraction template to generate a second set of graphic objects.

8. The method of claim 7, wherein the second display object is a tag component comprising text information associated with the first display object and the second display object.

9. The method of claim 7, further comprising, for each of the first set of graphic objects,
   calculating a distance between each of the second set of graphic objects and the graphic object; and determining a second graphic object that has the shortest distance to the graphic object as a corresponding graphic object.

10. A non-transitory computer-readable medium comprising computer-executable instructions that, when executed, are configured to cause a processor to perform operations comprising:
    receiving user input indicating a first display object within an industrial diagram, wherein the industrial diagram comprises a plurality of display objects;
    extracting the first display object to generate a first graphic extraction template, wherein the first graphic extraction template has the same type of the first display object;
    identifying one or more regions within the first graphic extraction template that include text information specific to the first display object;
    masking the text information;
    linking each of the one or more regions with at least a portion of an object name of the first display object;
    extracting all the display objects, from the industrial diagram, that are of the type of the first display object using the first graphic extraction template to generate a first set of extracted graphic objects; and
    for each of the first set of extracted graphic objects, matching text information within each of the one or more regions with at least a portion of an object name.

11. The non-transitory computer-readable medium of claim 10, wherein the industrial diagram is displayed on one or more pages.

12. The non-transitory computer-readable medium of claim 11, wherein the operations further comprise: determining an object location within the industrial diagram for each extracted display object.

13. The non-transitory computer-readable medium of claim 12, wherein the object location comprises a page number indicating a page at which the corresponding display object is extracted, and relative positions within the page.

14. The non-transitory computer-readable medium of claim 13, wherein the operations further comprise: generating an extraction file to include the first set of graphic objects and corresponding object name, object location, and object type for each of the first set of graphic objects.

15. The non-transitory computer-readable medium of claim 10, wherein each link is generated by relating a relative position of each of the one or more regions within the graphic extraction template to a relative position of each portion of the object name of the first display object.

16. The non-transitory computer-readable medium of claim 10, wherein the operations further comprise:
    receiving user input indicating a second display object which is associated with the first display object;
    extracting the second display object to generate a second graphic extraction template, wherein the second graphic extraction template has the same type of the second display object;
    applying mask on one or more regions within the second graphic extraction template containing text information specific to the second display object; and
    extracting all the display objects that are of the same type of the second display object using the second graphic extraction template to generate a second set of graphic objects.

17. The non-transitory computer-readable medium of claim 16, wherein the second display object is a tag component comprising text information associated with the first display object and the second display object.

18. The non-transitory computer-readable medium of claim 16, wherein the operations further comprise determining, for each of the first set of graphic objects,
    calculating a distance between each of the second set of graphic objects and the graphic object; and
    determining a second graphic object that has the shortest distance to the graphic object as a corresponding graphic object.

19. An apparatus to facilitate extraction of display objects for industrial diagram, the apparatus comprising:
    one or more computer-readable storage media;
    a processing system operatively coupled with the one or more computer-readable storage media; and
    program instructions stored on the one or more computer-readable storage media that, when executed, are configured to cause the processing system to perform operations comprising:
        receiving user input indicating a first display object within an industrial diagram, wherein the industrial diagram comprises a plurality of display objects;
        extracting the first display object to generate a first graphic extraction template, wherein the first graphic extraction template has the same type of the first display object;
        identifying one or more regions within the first graphic extraction template that include text information specific to the first display object;
        masking the text information;
        linking each of the one or more regions with at least a portion of an object name of the first display object;
        extracting all the display objects, from the industrial diagram, that are of the type of the first display object using the first graphic extraction template to generate a first set of extracted graphic objects; and
        for each of the first set of extracted graphic objects, matching text information within each of the one or more regions with at least a portion of an object name.

20. The apparatus of claim 19, wherein each link is generated by relating a relative position of each of the one or more regions within the first graphic extraction template to a relative position of each portion of the object name of the first display object.

* * * * *